United States Patent
Yamamoto

(12) 
(10) Patent No.: US 6,487,989 B2
(45) Date of Patent: Dec. 3, 2002

(54) POTTY FOR PET ANIMALS

(76) Inventor: Kazuko Yamamoto, 3026-1, Kamitsuruma, Sagamihara-shi, Kanagawa (JP)

( * ) Notice: Subject to any disclaimer, the term of this patent is extended or adjusted under 35 U.S.C. 154(b) by 0 days.

(21) Appl. No.: 09/888,003

(22) Filed: Jun. 22, 2001

(65) Prior Publication Data

US 2002/0000205 A1 Jan. 3, 2002

(30) Foreign Application Priority Data

Jun. 28, 2000 (JP) ........................................ 2000-194315
Jun. 13, 2001 (JP) ........................................ 2001-178029

(51) Int. Cl.[7] ............................................. A01K 29/00
(52) U.S. Cl. ........................................................ 119/161
(58) Field of Search ................................. 119/161, 165, 119/169, 166; 202/204

(56) References Cited

U.S. PATENT DOCUMENTS

| | | | | |
|---|---|---|---|---|
| 3,762,369 A | * | 10/1973 | Barnum | 119/161 |
| 3,796,188 A | * | 3/1974 | Bradstreet | 119/166 |
| 3,990,397 A | * | 11/1976 | Lowe, Jr. | 119/165 |
| 4,649,578 A | * | 3/1987 | Vargo | 119/161 |
| 4,771,731 A | * | 9/1988 | Derx et al. | 119/166 |
| 5,211,133 A | * | 5/1993 | Foley | 119/165 |
| 5,392,733 A | * | 2/1995 | Tominaga | 119/165 |
| 5,454,349 A | * | 10/1995 | Bondurant, III | 119/166 |
| 6,055,935 A | * | 5/2000 | Engel | 119/165 |
| 6,408,790 B1 | * | 6/2002 | Maguire | 119/165 |

FOREIGN PATENT DOCUMENTS

DE 4127835 A1 * 12/1992

* cited by examiner

*Primary Examiner*—Charles T. Jordan
*Assistant Examiner*—Jordan Lofdahl
(74) *Attorney, Agent, or Firm*—Bierman, Muserlian and Lucas

(57) ABSTRACT

The potty for a pet animal of the present invention comprises an outer case for the potty, an internal case to be contained in the outer case and is constituted by having an opening at the bottom part and forming a reticular member at the opening part, where an amount of sand is provided on the upward side of the reticular member, and a cover to be internally fitted to the opening of the internal case and having a hole at the central part for excretion purpose. According to the potty of the present invention, the amount of sand that a cat scatters and spoils the surrounding of the potty at its excretion may be minimized, and the space required for setting the potty may be reduced to a compact size.

13 Claims, 14 Drawing Sheets

(A)

(B)

(C)

POTTY FOR PET ANIMALS

The entire disclosure of Japanese Patent Applications No. 2000-194315 filed on Jun. 28, 2000 and No. 2001-178029 filed on Jun. 13, 2001 including specification, claims, drawings and summary is incorporated herein by reference in its entirety.

FIELD OF INVENTION

The present invention is related to a potty to be used for such pet animals as a domestic cat.

BACKGROUND ART

In recent time, the number of population who are rearing a pet animal, such as domestic cat, in a house has been increased.

However, a pet animal cannot use a lavatory by itself, and therefore, a human has to interveniently take care of cleaning the excretion of a pet animal, for which substantial time and labor had to be required.

Namely, a cat requires sand when it excretes based on the instinctive behavior thereof, it is thus required to bring a potty with sand into a house, which causes introduction of some conditions similar to the outdoor into a room.

FIG. 14 is an example for the conventional potty for cat use, wherein sand 02 is put in a sand tray 01.

For using such conventional potty indoors, various proposals for improvement in the use have been made in view of resolving smell and sanitary problems. However, there are yet problems as described below for such conventional potties in terms of cleaning excretion and the constitutional structure.

(1) Since substantial space is required to place the potty, it is problematic when placing it in a small house.
(2) The amount of the dairy excretion is rather big in quantity, which gives difficulty in bringing it for trash. For example, when water-absorbing sand is used for collecting urines, said sand tends to be solid after absorbing urines to make greater solid lump, causing problem of increasing trash in quantity.
(3) In particular, a cat need sand when it excretes, the consumption of sand by a cat becomes great, and the amount of sand to be brought into a house is enormous, which additionally causing difficulty in storing sand.
(4) Further, when using the sand tray 01 whereto sand 02 is placed as a potty, a cat tends to spoil rooms with the legs being fouled with his excretion since a cat directly contacts to the sand 02 in the tray 01. In particular, such spoiling of rooms is more serious when a cat is sick in diarrhea.
(5) Further, during the excretion, the sand 02 is scattering around the tray 01, thereby causing a need for cleaning.
(6) In addition, from a viewpoint of interior decoration, placing the tray 01 containing the sand 02 as it is disfigures the atmosphere.

DISCLOSURE OF INVENTION

The present invention is directed to solve such problems recited above and to provide a potty for a pet animal, which may reduce the amount of the sand that spoils the indoor and is scattered by such pet animal as a cat to the minimum and is constituted in a compact shape requiring less space for the placing.

The potty for a pet animal according to the present invention overcomes the problems as described above and is characterized in that the potty for a pet animal is constituted by an outer case of which upper part being opened, an internal case to be contained in the outer case and is constituted by forming a reticular member at the central part of the bottom, and a cover to be internally fitted to the upper peripheral part of the opening of the internal case and having a hole at the central part for excretion purpose.

In the potty for a pet animal according to the invention specified above, an amount of sand may be provided onto the reticular member formed in the internal case.

In the potty for a pet animal according to the invention specified above, the reticular member formed in the internal case may be either a reticular member or a latticed member which covers the hole formed in the bottom central part of the internal case.

In the potty for a pet animal according to the invention specified above, the reticular member formed in the internal case may be either a reticular member or a latticed member being formed in accreted state to the internal case.

In the potty for a pet animal according to the invention specified above, the outer case and the internal case may be united in watertight state at each flange parts of the both cases and are detachably constituted.

In the potty for a pet animal according to the invention specified above, a guard member for covering the peripheral margin of the cover and having an opening for using as an access for a pet animal at the front and the rear sides of the case in the longitudinal direction may be provided.

In the potty for a pet animal according to the invention specified above, the outer case and the internal case may be united in watertight state at each flange parts of the both cases and may be detachably constituted, and the internal case, the cover and the guard member may be detachably fitted with each other at the peripheral margin of the potty.

In the potty for a pet animal according to the invention specified above, the cover and the guard member may be constituted in accreted state by means of molding.

In the potty for a pet animal according to the invention specified above, a hole for excretion may be formed at the central part of the cover and a mat containing fine pores for excluding the sand may be set on the upper part of the cover.

In the potty for a pet animal according to the invention specified above, a plurality of fine pores for excluding the sand downward may be formed in the cover.

In the potty for a pet animal according to the invention specified above, a water-absorbing means may be provided onto the bottom of the outer case.

In the potty for a pet animal according to the invention specified above, the bottom part of the cover may be formed so as to gradually incline downward in a direction to the central opening part of the case.

In the potty for a pet animal according to the invention specified above, a drawer member may be provided in containable manner onto the bottom of the outer case and a water-absorbing means may be provided in the drawer member.

In the potty for a pet animal according to the invention specified above, the pet animal to use the potty may be a cat.

In the potty for a pet animal according to the invention specified above, the potty may be installed into a cage for a pet animal.

In the potty for a pet animal according to the invention specified above, the potty may be installed into a piece of furniture for a pet animal.

In the potty for a pet animal according to the invention specified above, the potty may be installed into an athletic house for a pet animal.

In the potty for a pet animal according to the invention specified above, the potty for a pet animal may be installed into an athletic house for a pet animal, wherein a mean for rubbing nails is provided on the roof of the athletic house.

BRIEF EXPLANATION FOR DRAWINGS

BEST MODE FOR CARRYING OUT THE INVENTION

Now, the present invention is further described in detail with referring the embodiments described below, however, it should be noted that the present invention shall not be limited to the scope within the description in the embodiments given below.

The embodiments described below are explaining about the potty for a pet animal when it is the one for a cat, however, the potty according to the present invention should not be limited to the potty for a cat.

[The First Embodiment]

Figure 1:
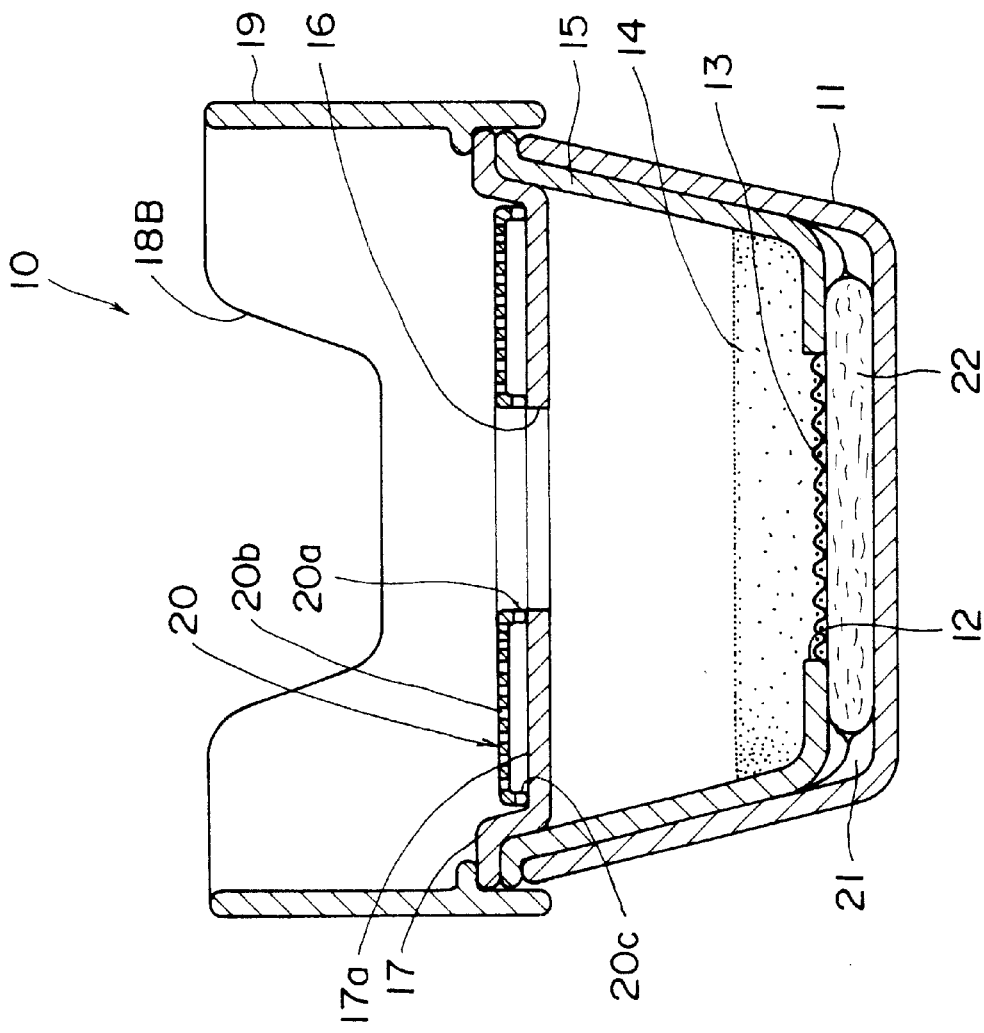
FIG. 1 is a schematic drawing showing the potty for a pet animal according to the first embodiment described below.
Figure 2:
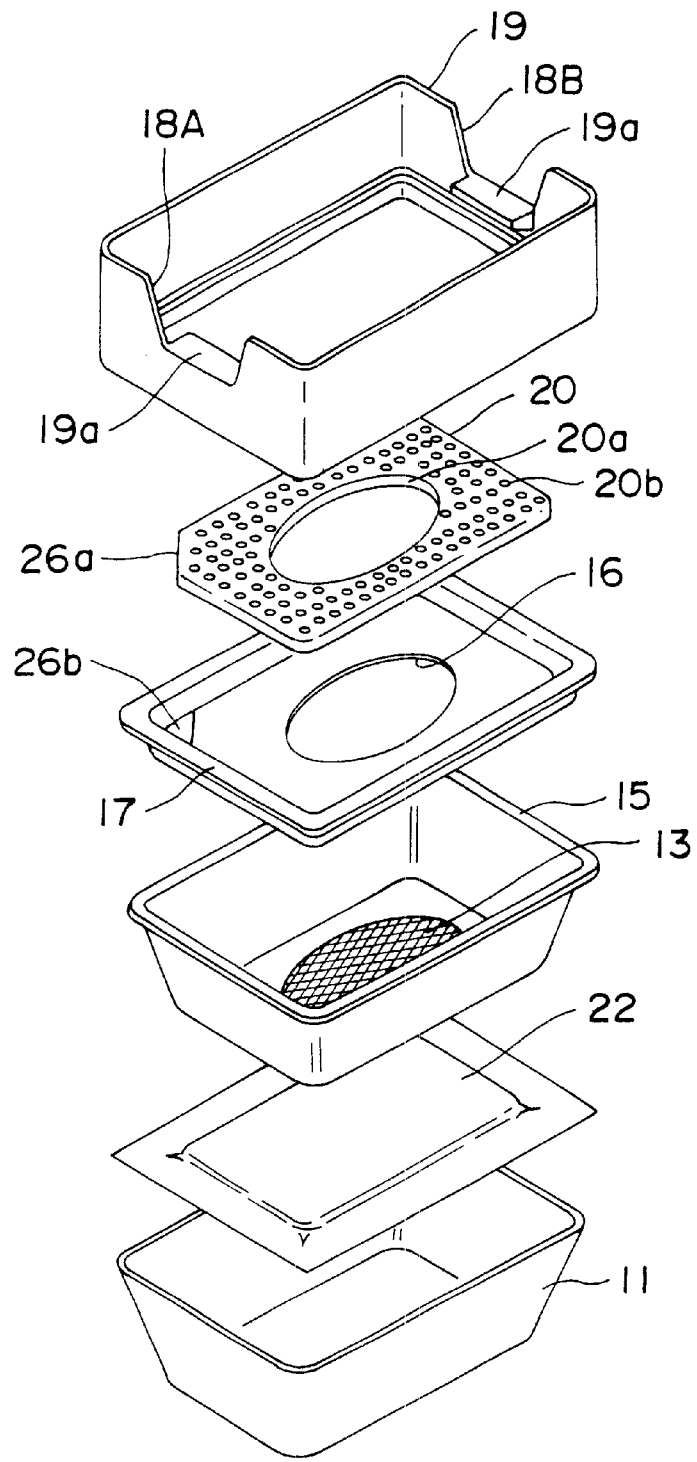
FIG. 2 is an open drawing showing the potty for a pet animal according to the first embodiment.
Figure 3:
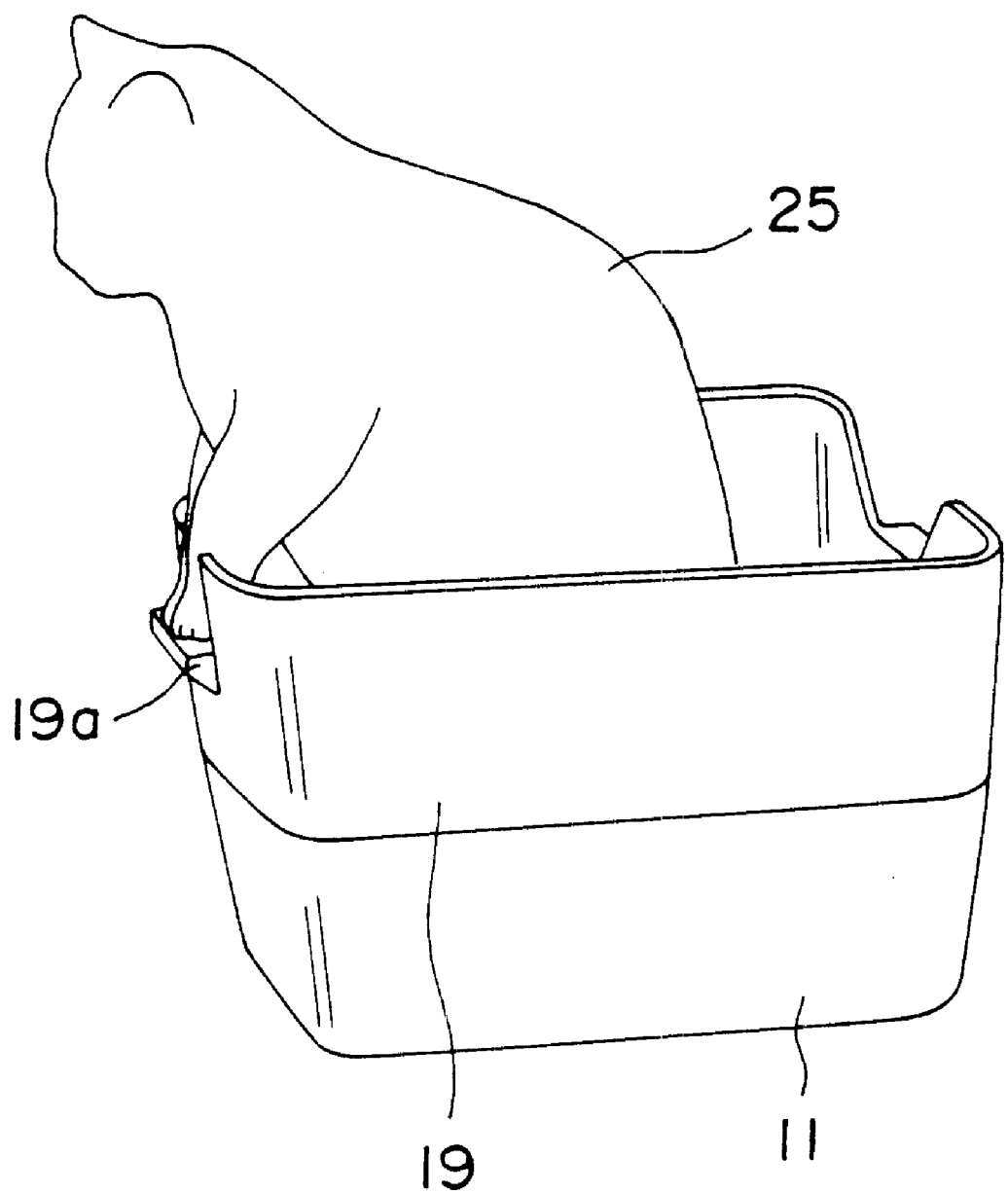
FIG. 3 is an illustration for showing how to use the potty for a pet animal according to the first embodiment.

FIG. 1 is a schematic drawing showing the potty for a pet animal according to the present invention, FIG. 2 is an open drawing for showing the same, and FIG. 3 is an illustration for showing a view of that the potty is used by a cat.

As shown in these figures, the potty for a pet animal 10 according to the instant embodiment is constituted by an outer case (hereinafter referred as "Outer Case") 11, an internal case 15 (hereinafter referred as "Internal Case") contained in said outer case 11 of the potty and constituted by providing an opening 12 in the bottom and a reticular member 13 on the opening 12 and providing sand 14 onto the upper side of said reticular member 13, and a cover 17 having a hole 16 at the central part for excluding the excretion.

In this embodiment, a guard member 19 which covers the peripheral margin of the cover 17 and has openings 18A and 18B to be used as an access for a pet animal at the front and the rear parts of the case in the longitudinal direction is detachably provided onto the cover 17.

By providing the guard member 19, it is allowed to fix the circumstance for a cat at use, such as positioning of a cat at excreting.

On the upper side of the cover 17, a hole 20a for excretion in a shape similar to the shape of the hole 16 formed in the cover and a mat 20 for excluding the sand downward, wherein a plurality of fine pores 20b for excluding the sand is contained, are provided.

A leg member 20c is provided to the reverse side of the mat 20 for excluding sand to provide a space in between the upper surface of the cover 17, then to exclude the sand 14 attached to the legs of a cat when it stepped on the mat installed on the upper side 17a of the cover 17 through said space.

The sand 14 being stored onto the upper side of the cover 17 may be collected by inclining the cover 17 or by using a brush and then send to them to the sand pool. Alternatively, either fine pores or a cutting for excluding the sand may be formed in the part of the cover 17.

In the space 21 provided between the bottom surface of the outer case 11 and the internal case 15, a water-absorbing sheet 22 is installed as a water-absorbing means to absorb the excreted urines.

For preventing displacement of the water-absorbing sheet 22, the sheet 22 is preferably fixed by inserting the edges thereof in between the wall of the outer case 11 and the wall of the internal case 15 when both cases are jointed.

The water-absorbing sheet 22 is preferably contacted and connected to the reticular member 13 formed in the internal case 15.

This is because that moisture arising from the excretion, etc. absorbed in the sand 14 may be easily transferred when the sheet 22 is contacted to the reticular member 13. During the transfer of moisture, the sand 14 may not drop onto the water-absorbing sheet because the sand may be blocked at the reticular member 13.

By using the water-absorbing sheet 22, moisture contained in the excretion may be absorbed to thereby increase the solidity of the excretion on the sand 14.

As a result, the required frequency to change the water-absorbing sheet may be reduced to 3 to 4 times a day when using the potty according to the present invention in case of a medium size cat, contrary to need to change the water-absorbing sheet every day when a conventional potty for a pet animal is used.

As shown in FIG. 2, a cutting space 26a or 26b for storing a scoop is respectively formed at a part of the cover 17 and at a part of the bottom of the mat 20 to lodge a scoop for removing the feces of a cat.

Figure 13:
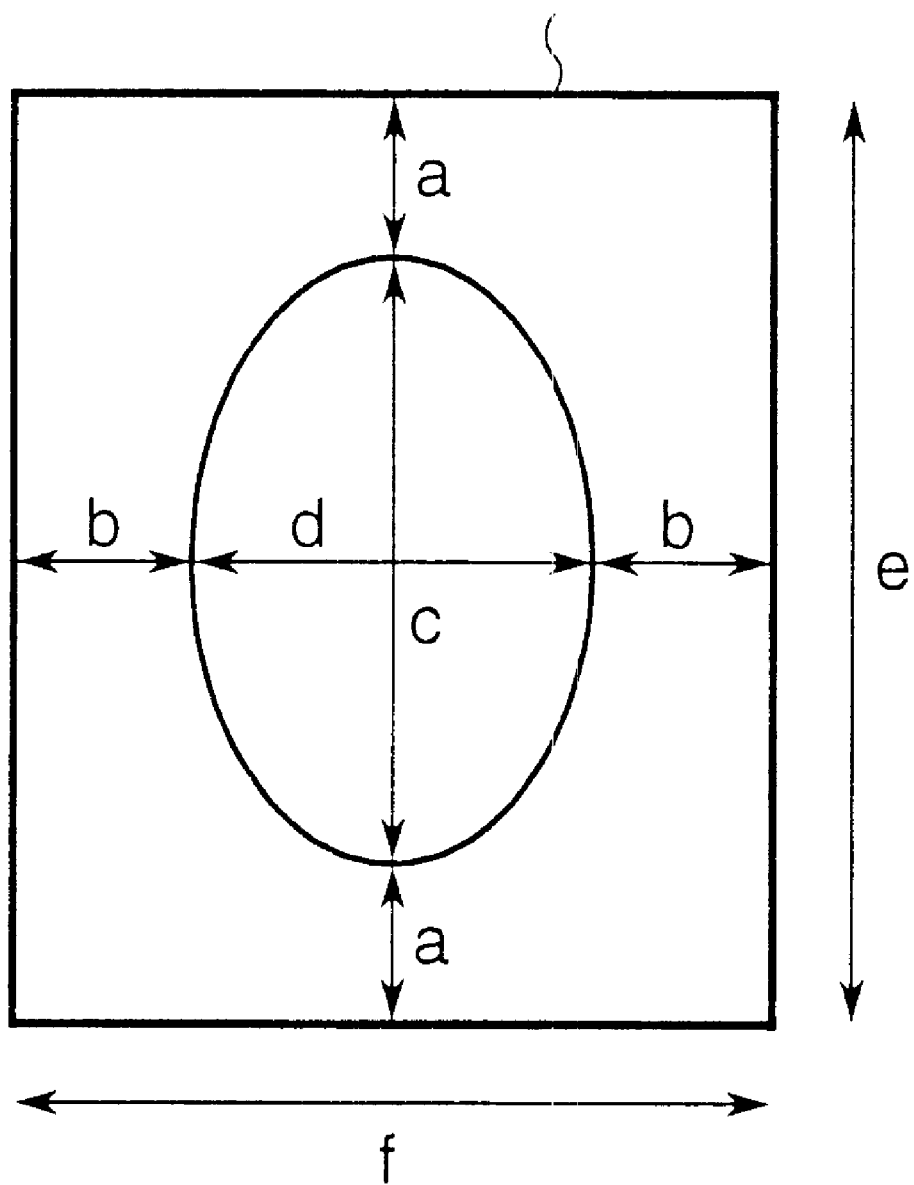
FIG. 13 is dimensional schematic diagram for the cover of the potty for a pet animal according to the present invention.
Figure 14:
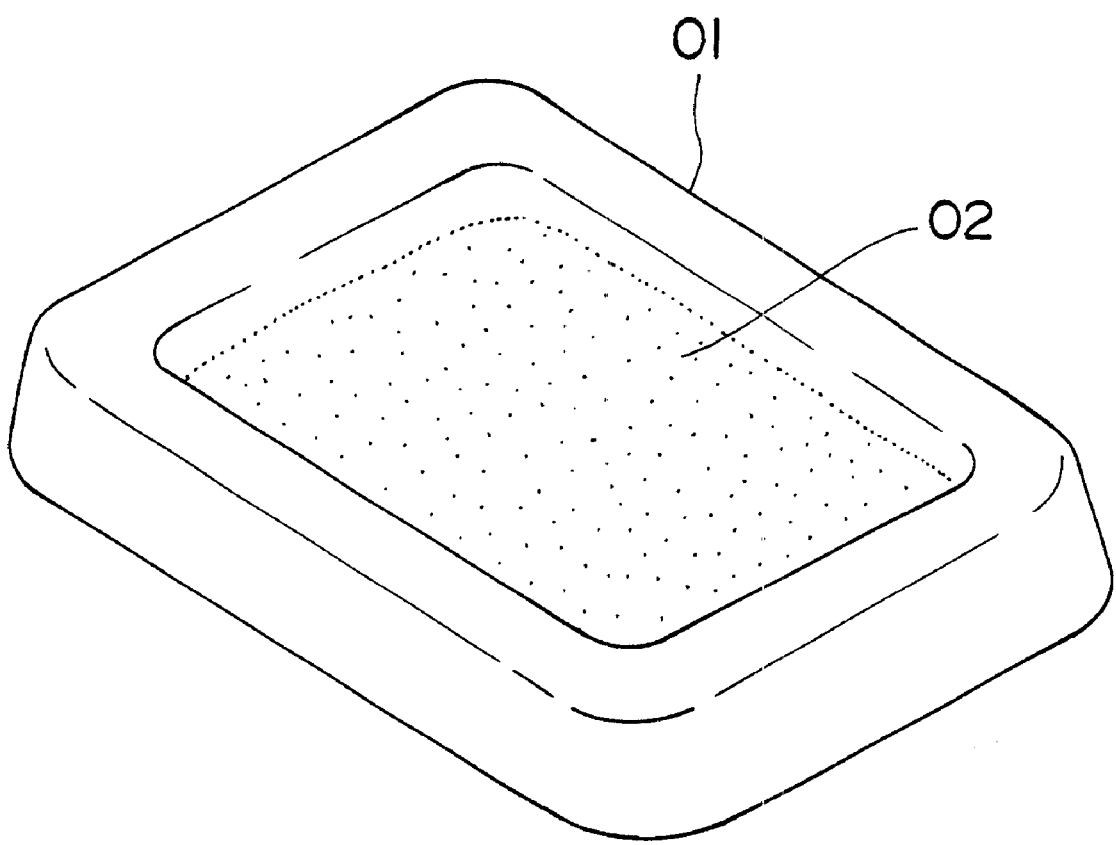
FIG. 14 is a schematic drawing showing a prior art potty for a pet animal.

Now, typical sizes of the cover 17 for the potty according to the present invention are given in FIG. 13.

However, the sizes given below are just indicated as examples, and it should be noted that the size of the potty according to the present invention are not limited to the ones shown below.

Large type is for a big size pet animal having a weight of 6 Kg or more.

Medium type is for a medium size pet animal having a weight of from 2 to 6 Kg.

Small type is for a small pet animal having a weight of 2 Kg or less.

In FIG. 13, a and b each represents a distance from the cover 17 to the hole 16, c represents the longer diameter of the hole 16, d represents the shorter diameter of the hole 16, e represents the longitudinal inner dimension of the cover 17 and f represents the inner dimension in the orthogonal direction to the longitudinal direction of the cover 17.

- a: L 7–8 cm
  M 6–7 cm
  S Around 5 cm
- b: L Approximately 8 cm
  M Approximately 6.5 cm
  S Approximately 5 cm
- c: L Approximately 21 cm
  M Approximately 18 cm
  S Approximately 15 cm
- d: L Approximately 14 cm
  M Approximately 10 cm
  S Approximately 7.5 cm
- e: L Approximately 37 cm
  M Approximately 32 cm
  S Approximately 25 cm
- f: L Approximately 30 cm
  M Approximately 25 cm
  S Approximately 18 cm Since the dimension of the conventional potty for a pet animal is 38–39 cm×48–49 cm more or less, the potty of the present invention could have achieved to reduce the size to 70% more or less of the conventional type.

When a cat uses the potty of the present invention, the cat 25 will firstly ride on the mat 20 for excluding sand and it can touch the sand 14 with its leg through the hole 20a. Therefore, the potty according to the present invention allows the cat to note the presence of the sand, to dig the sand before excretion and then to start excretion with ease.

Further, since the cat steps on the mat 20 for excluding the sand and excretes through the hole, any parts, such as legs, of the cat do not directly contact to the sand 14. Therefore, it is hygienically advantageous since the excretion of the cat would not be attached to the legs or the like of the cat.

In addition, even though the cat digs the sand, the sand would not be scattered outside the case because the cover 17 can fence the scattering sand.

Besides, a protruding part 19a also useful as a handle is provided at the lower side of the opening 18A and 18B used as an access of the guard member 19, and a cat 25 may place its foreleg on the handle 19a during the excretion (See FIG. 3).

As described above, a cat requires sand 14 for covering or hiding its excretion therewith, and although the excretion by a cat is not taken place directly on the sand 14 when using the potty according to the present invention, the cat can take behavior of excretion with ease as it can see the presence of the sand 14 placed in the internal case 15.

Therefore, the potty according to the present invention allows a cat to take excretion behavior without directly contacting with sand, and to prevent scattering of the sand around the potty even though a cat digs sand before and after the excretion, where the sand would be just mixed in the internal case.

Further, by means of providing the mat 20 for excluding sand, because the sand 14 is excluded through the fine pores 20b into the upper side of the cover 17, almost no sand is attached to the soles of a cat when it comes out of the potty and thus no spoiling of rooms is caused, even though a cat 25 contacted with the sand 14.

In particular, when a cat is sick with diarrhea, it is more advantageous that less excretion is attached to the legs of a cat, since a cat does not directly contact to the sand. As the sand can absorb almost no urines, it is simply required to trash only the feces being mixed with small amount of sand.

There is no specific limitation for the sand to be used in the potty for a pet animal according to the present invention, however, the amount of the sand can be reduced when using the potty of the present invention.

Although ordinary sand can be used as well, it is preferable to use special sand for a pet animal since ordinary sand has no deodorant activity.

Also, as the sand, it is preferable to use the one having no caking property after absorbing urines, because the excreted urines can immediately be excluded into the water-absorbing sheet.

The moisture contained in the excretion penetrates into the sand so that the volume of the excretion may be reduced.

By means of providing a constitution wherein feces and urines can be separated, it allows to reduce handling job, such as changing sand, cleaning of the excretion, etc.

In the present embodiment, a product of tray sand for small animals (Trade Name: Silica Dry, manufactured by Johnson Trading Co., Ltd.) is used as the sand. This sand is treated as waterproof, and it does not cause cracking even after absorbing water and urines and is durable for a long time. Further, the water absorbance of this sand is very fast and may absorb greater amount of urines because the particle size of the fine particles is large. Therefore, this sand is preferable to use for the potty for a cat according to the present invention.

Now, how to use the potty according to the instant embodiment is explained in the following.

A cat has a habit to check if it is its own excretion place or not by smelling sand, therefore, a cover 17 of the potty is removed and a cat is allowed at first to excrete on the sand to get it used to the place.

It is enough to let a cat to directly contact to the sand for 3 to 4 days, or 1 week at the longest.

Then, the sand having been used by the cat and spoiled with urines is placed in the center of the sand pool.

The amount of the sand is gradually increased until a pet animal gets used to the sand, and then gradually reducing the amount to an extent that the depth of the sand be in around a range of from 3 to 5 cm when the cat got used to take excretion behavior on the mat installed onto the cover, in case of a middle size pet animal.

The water-absorbing sheet 22 is required to change depending upon the number of pet animals to be reared, however, the sheet is preferably changed at an interval of 4 to 5 days for 1 animal, or every other day for 3 animals. However, such interval may be varied because of the individual difference.

The excreted feces are removed by using a scoop when required.

The sand is also required to be changed, however, it was not required to change for 2 to 3 weeks for 3 animals, though it may depend on the moisture condition in the sand pool. If smell is coming outside the potty, the sand should be changed with the new one.

The adaptability of a pet animal varies depending on the individual difference, however, it was noted that 10 animals out of 11 animals got used to using the potty of the instant invention in a period of from 1 to 4 weeks.

[Second Embodiment]

Figure 4:
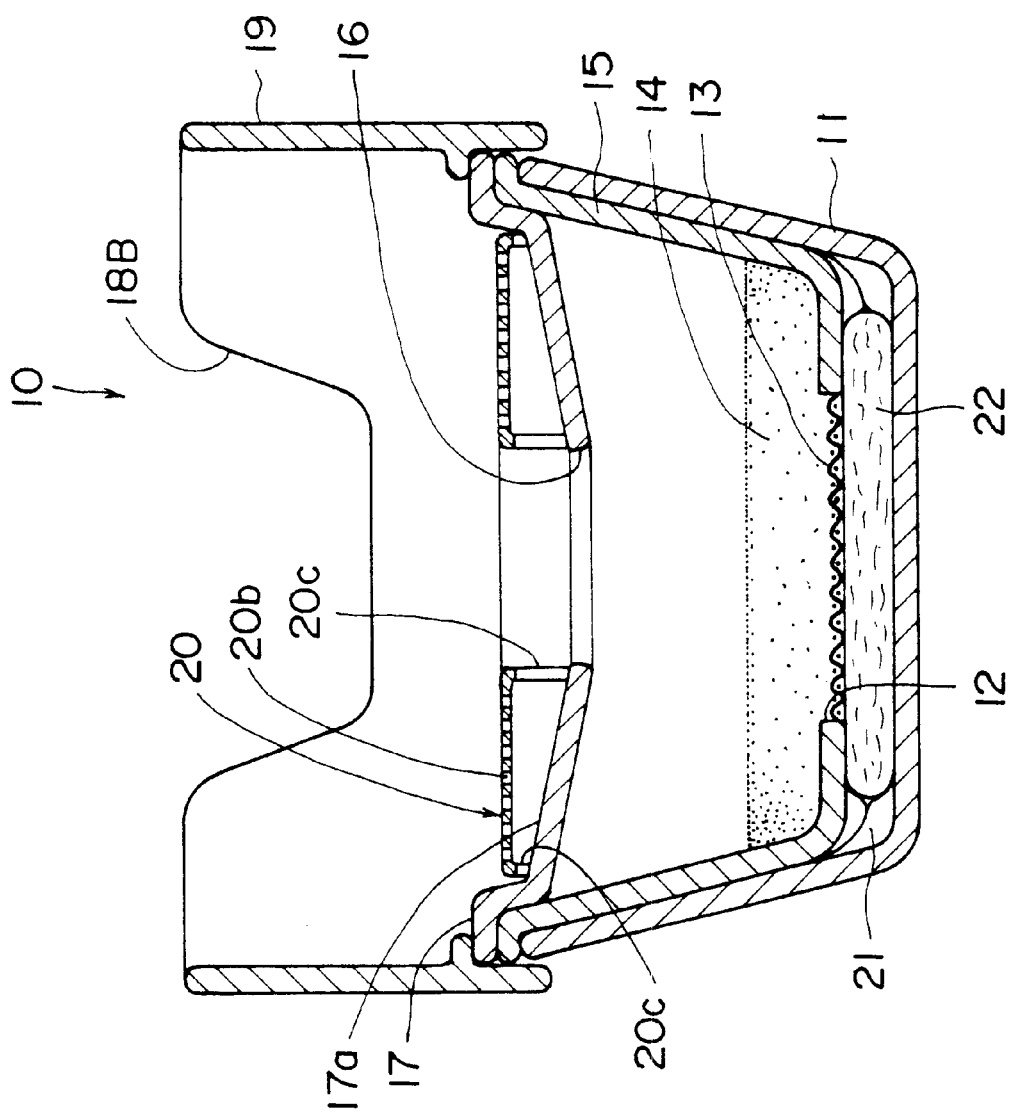
FIG. 4 is a schematic drawing showing the potty for a pet animal according the second embodiment described below.

FIG. 4 is a schematic drawing showing the potty for a pet animal according to the second embodiment for the present invention.

In this embodiment, the bottom of the cover 17 is inclined in a direction to the central hole 16 to facilitate the falling of the sand 14 excluded from the mat 20 into the sand pool.

Since the bottom of the cover 17 is inclined toward the hole 16, the height of the leg 20c for the mat 20 at the side of the hole 16 is adjusted to be longer than the other side to maintain the horizontal condition of the mat 20.

[Third Embodiment]

Figure 5:
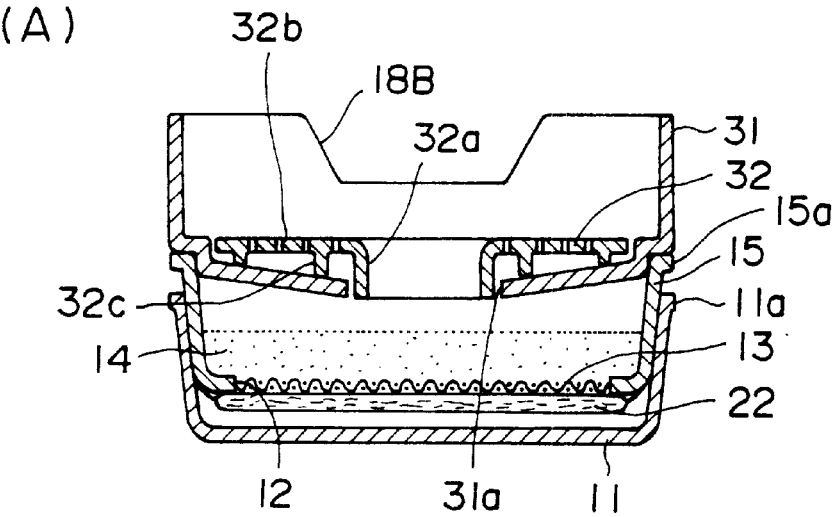
FIG. 5 is a schematic drawing showing the potty for a pet animal according the third embodiment described below.
Figure 5:
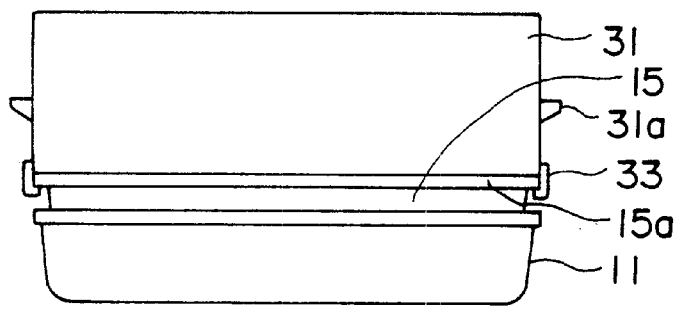
Figure 5:
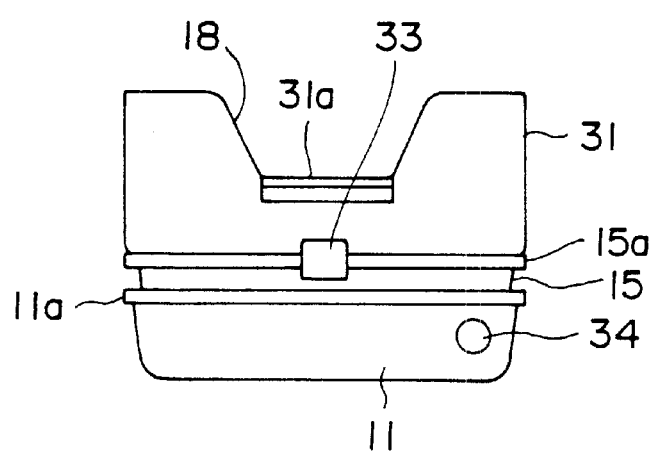

FIG. 5 is a schematic drawing showing the potty for a pet animal according the third embodiment for the present invention.

In the potty for a pet animal according to this embodiment, the cover 31 is constituted by uniting the cover 17 given in the first embodiment and the guard member 19, and is fitted to the opening of the internal case 15.

The bottom of the cover 31 is inclined toward the central opening 31a to facilitate the falling of sand 14 excluded from the mat 32 into the sand pool.

The central opening part 32a of the mat 32 is formed so as to extend to a level that is below the position of the opening 31a of the cover 31 so that feces and urines may attach to the mat but not to the cover and can be cleaned by only cleaning the opening part 32a of the mat.

The opening 32a of the mat is formed in a round shape, which allows the attached feces and urines to the margin of the opening to easily flow into the sand pool at cleaning.

At the peripheral margins of the internal case 15 and the outer case 11, a flange part 11a or 15a is respectively provided to make no empty space and to hold sealed condition between said two cases, allowing to enclose smell of the excretion in the case, and the flange parts also facilitate separation of said two case when it is required.

Further, the cover 31 and the internal case 15 are fixed in an united state together with the flange 15a by using a stopper 33 provided at the longitudinal side, so that the case does not jounce during the time that a pet animal is digging the sand.

Furthermore, a transparent window 34 is provided at a part in the side of the outer case to facilitate checking of water absorbance state by the water-absorbing sheet 22, thereby allowing to easily note a timing of changing said sheet.

In this sense, as the material for the water-absorbing sheet, it is preferable to use a material which can show any difference in the material state depending on the water-absorbing condition. For example, water absorbance condition of the sheet may be noted by giving a color to the sheet.

Whereas, stoppers 33 are respectively provided at the margin of the outer case 11 and the internal case 15, and the upper parts of those stoppers are each positioned in staggered sate with each other, therefore it is easy to separate the outer case 11 and the internal case 15 even after being united for turnout.

[Fourth Embodiment]

Figure 6:
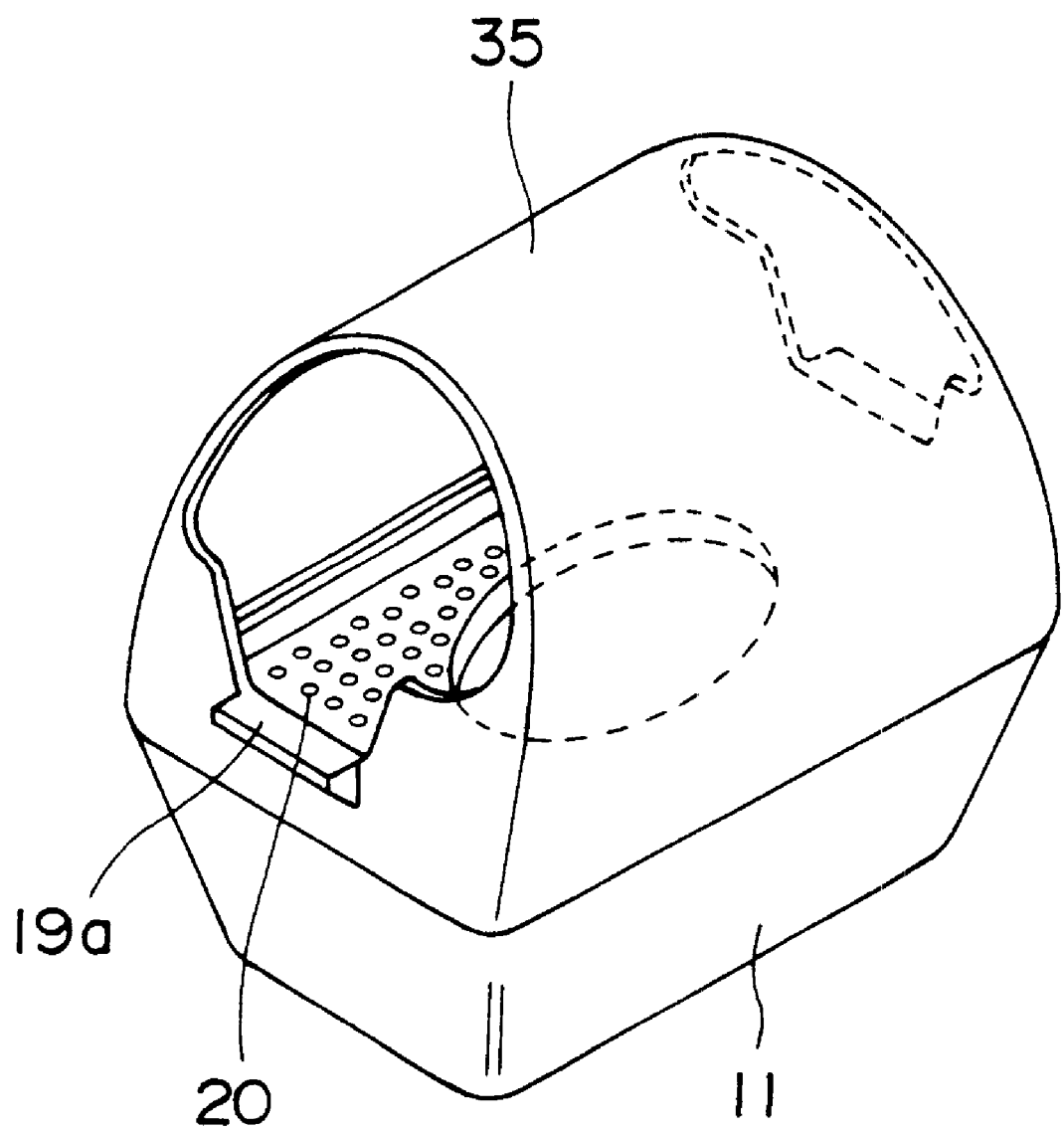
FIG. 6 is a schematic drawing showing the potty for a pet animal according the forth embodiment described below.

FIG. 6 is a schematic view showing the potty for a pet animal according to the instant embodiment.

In this embodiment, a cover 35 for covering the upper part of the potty case is provided in a form accreted with a guard member. This cover 35 may be constituted in a detachable structure.

[Fifth Embodiment]

Figure 7:
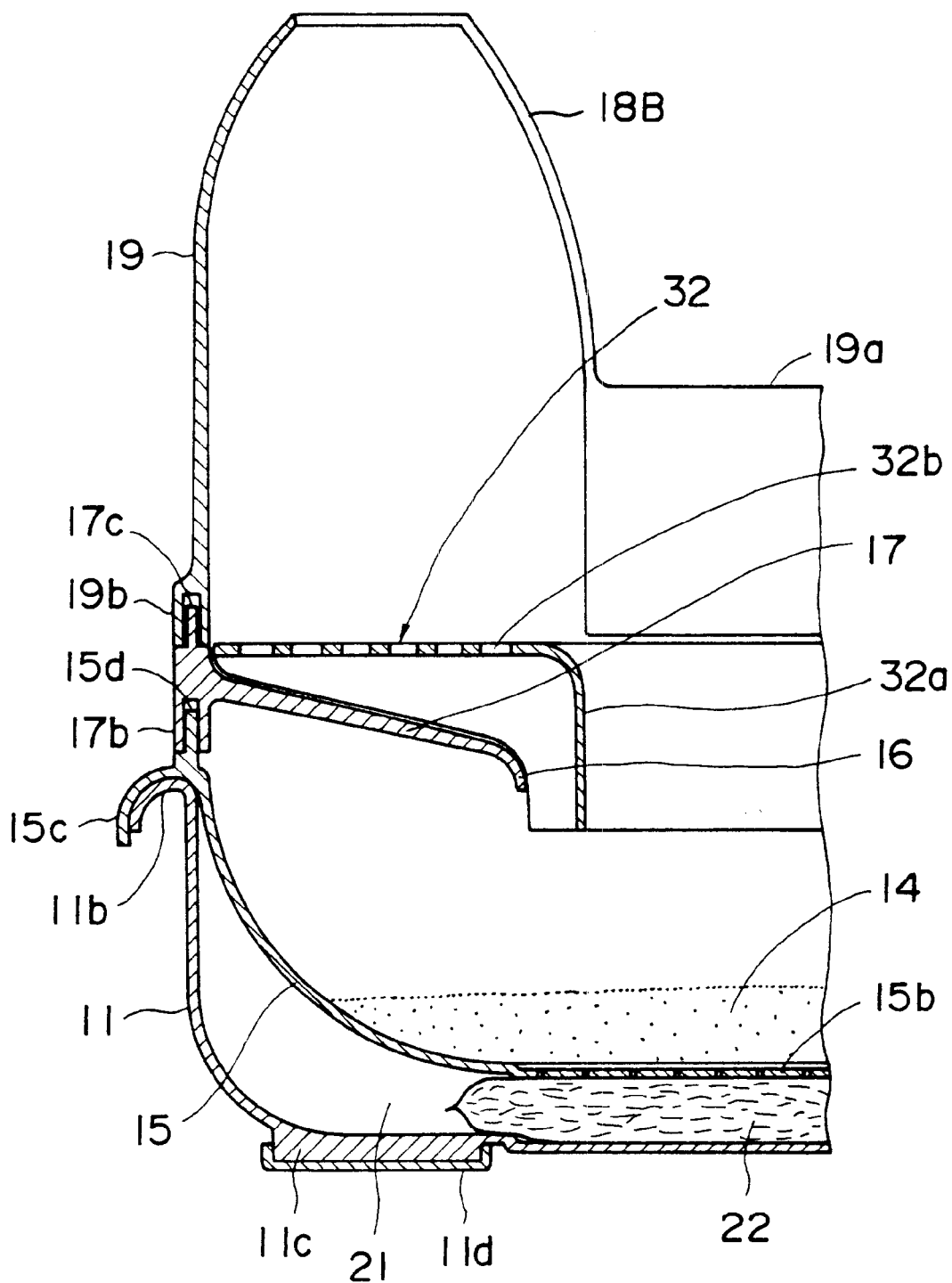
FIG. 7 is a schematic drawing showing the potty for a pet animal according the fifth embodiment described below.
Figure 8:
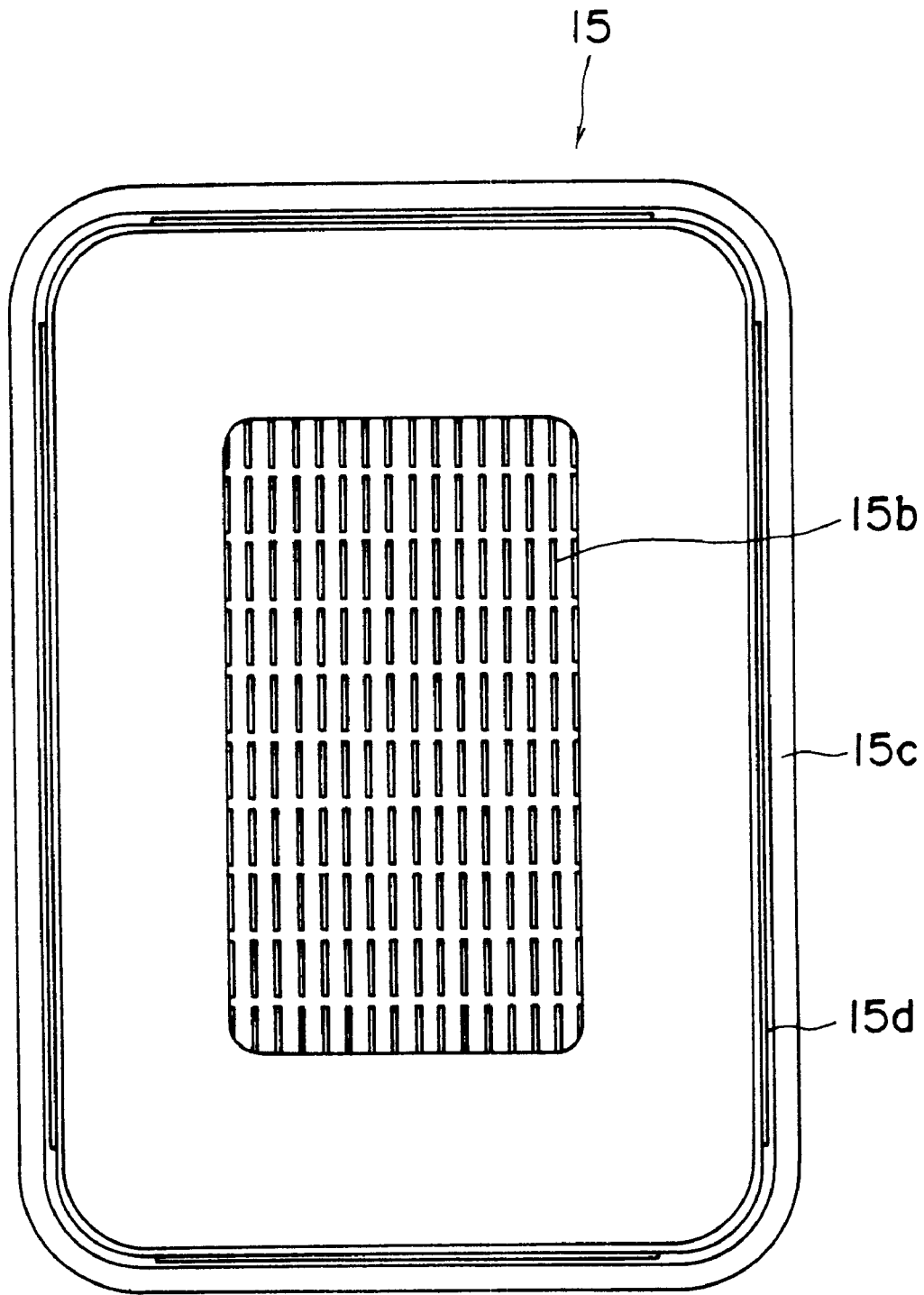
FIG. 8 is a schematic grand plan showing the potty for a pet animal according to the fifth embodiment.
Figure 9:
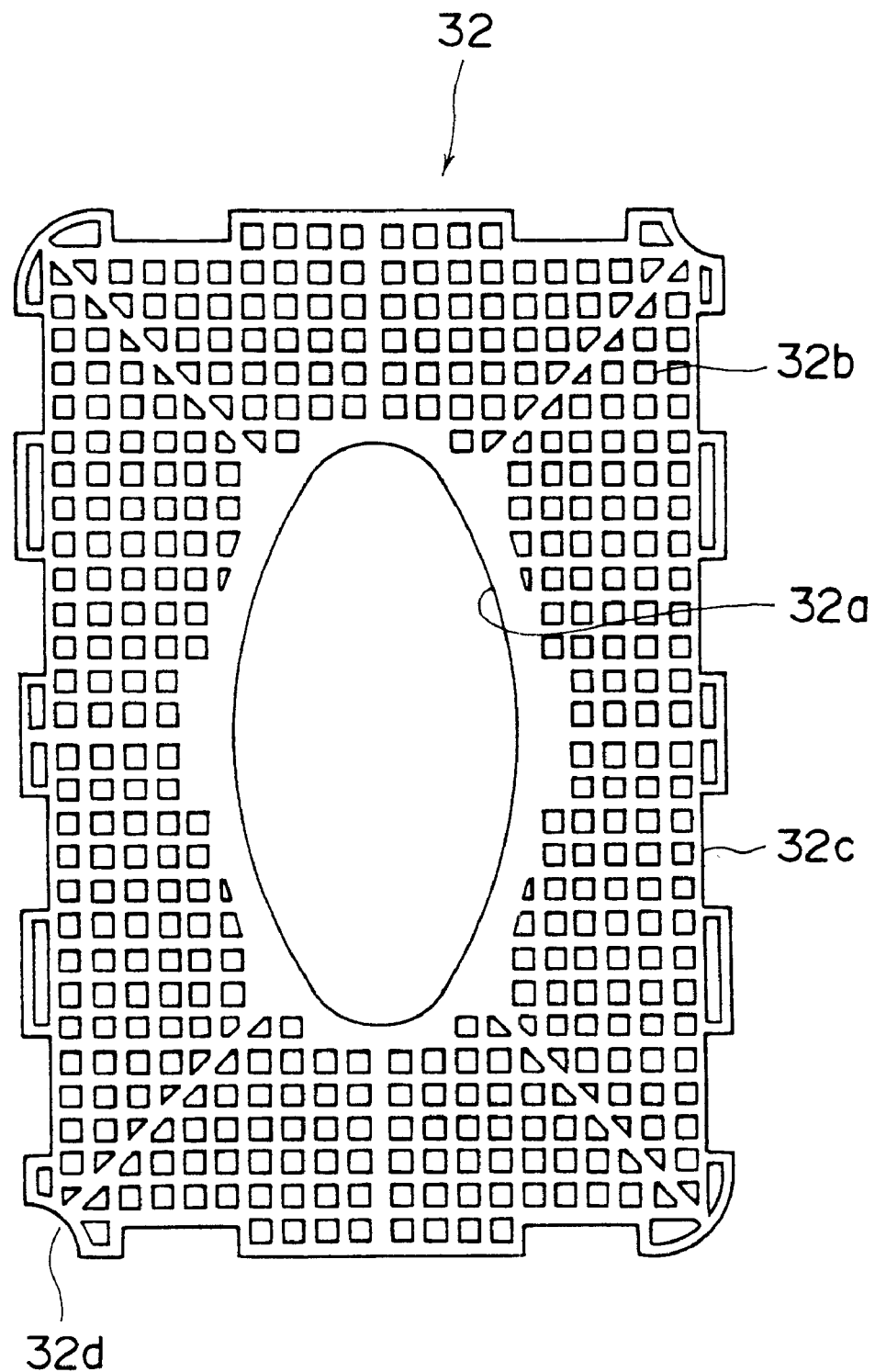
FIG. 9 is a schematic drawing showing the mat for excluding sand according to the fifth embodiment.

Each of FIGS. 7 through 9 is a schematic plan showing the potty for a pet animal according to the instant embodiment.

In this embodiment, as shown in FIG. 8, no hole is provided to the internal case 15, and a latticed member 15b is provided in a united form with the internal case instead of the reticular member. This type of cover may be easily produced by molding using a resin, etc.

Whereas, in the present embodiment, the outer case 11 and the internal case 15 are detachably united in watertight condition at each flange parts 11b and 15c of both cases.

Owing to the constitution just described above, smell of the excretion in the space 21 does not directly leak to the outside.

Whereas, upward projection 15d is formed on the flange part 15c of the internal case 15, and the projection is detachably fitted to a groove 17b formed in the peripheral margin of the cover 17. Whereas, another upward projection 17c is formed on the peripheral margin of the cover 17 and the projection is detachably fitted to a groove 19b formed in the peripheral margin of the guard member 19.

Since said detachable projections 15d and 17c are formed in upward state, contrary to forming a groove, there is no problem that the sand 14 gets into the groove, thereby assuring the fitting and the detaching between the internal case and the cover, and the cover and the guard member.

Further, in this embodiment, a leg member 11c is uninterruptedly provided to the reverse side of the bottom of the outer case 11, and a sliding stopper lid is fitted into the leg member 11c to prevent the outer case to slide readily.

As shown in FIG. 9, cutting parts 32c are formed at a certain interval around the peripheral margin of the mat 32 for excluding the sand to facilitate the excluding of sand.

Also, corner cutting parts 32d are formed in some corners of the mat 32 for excluding the sand to facilitate picking-up and fitting of the mat.

[Sixth Embodiment]

Figure 10:
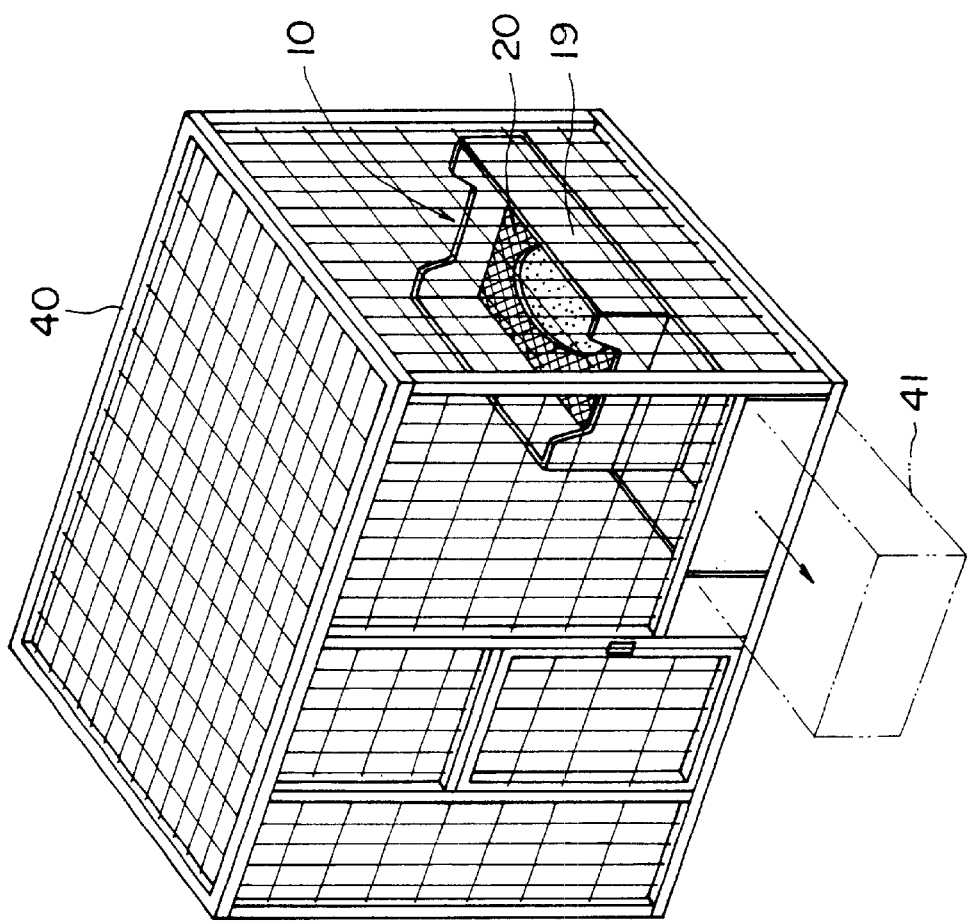
FIG. 10 is a schematic drawing showing the potty for a pet animal according the sixth embodiment described below.

FIG. 10 is a schematic drawing showing the potty for a pet animal according to this sixth embodiment.

The potty of this embodiment is placed in a cage 40.

In this embodiment, the outer case 11 given in the first embodiment and the internal case 15 are prepared in a drawer type case 41 to facilitate the change of the sand 14, trashing the excretion in the case and the water-absorbing sheet 22.

Further, certain space may be given in front of the drawer type case to contain a water-absorbing sheet, sand, scoop, etc. therein.

[Seventh Embodiment]

Figure 11:
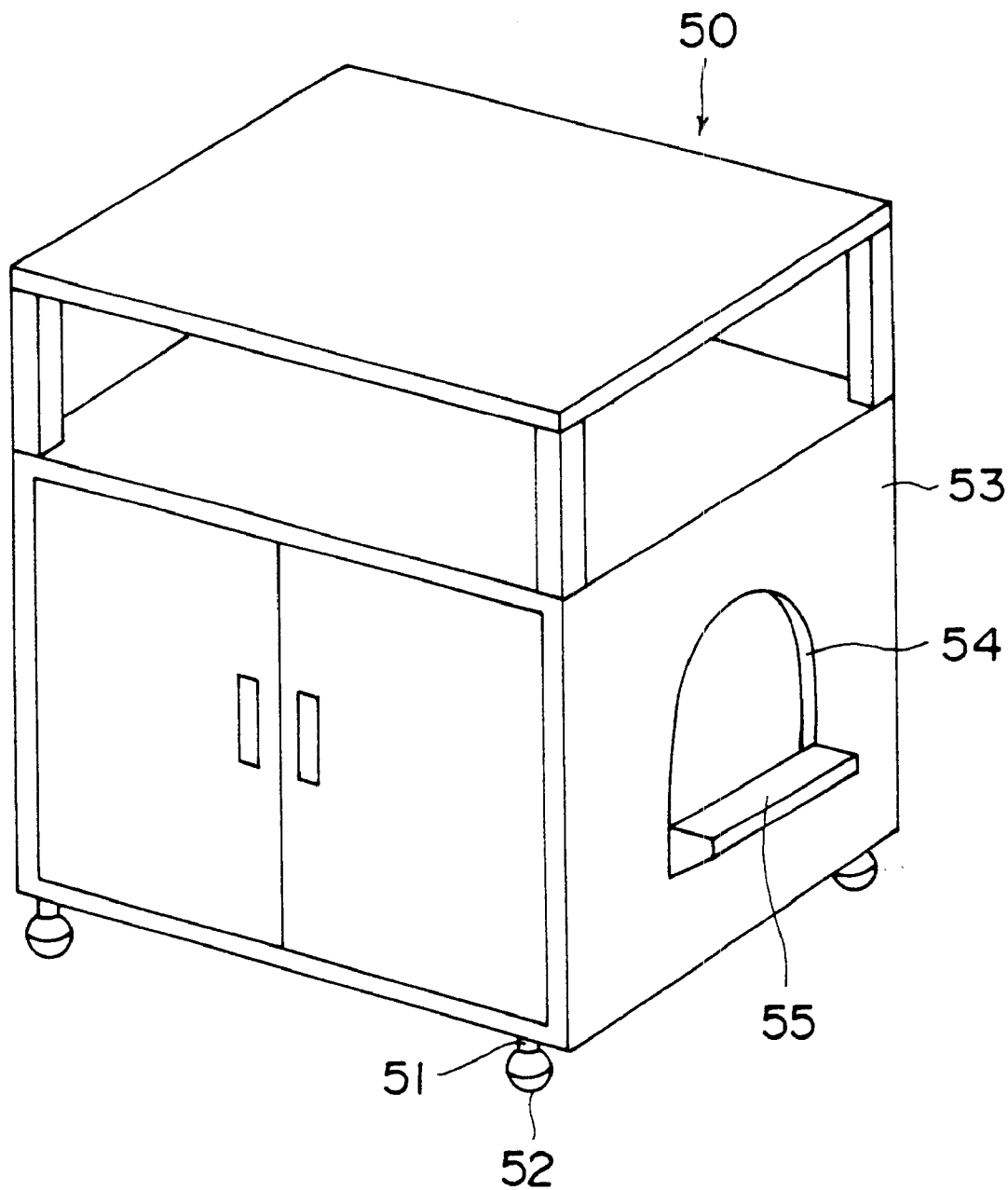
FIG. 11 is a schematic drawing showing the potty for a pet animal according the seventh embodiment described below.

FIG. 11 is a potty for a pet animal according this seventh embodiment for the present invention.

In this embodiment, the potty for a pet animal is contained in a table 50.

The table 50 is movable owing to a castor 52 provided to the leg member 51, and the potty for a pet animal 10 shown in FIG. 1 is contained in a cabinet 53.

In the opposite side plates of the cabinet 53, openings 54 are provided, and a step 55 is respectively formed at the bottom side of the opening 54 to facilitate the access of a cat.

Alternative, a bookshelf may be used to contain the potty of the present invention instead of the table.

[Eighth Embodiment]

Figure 12:
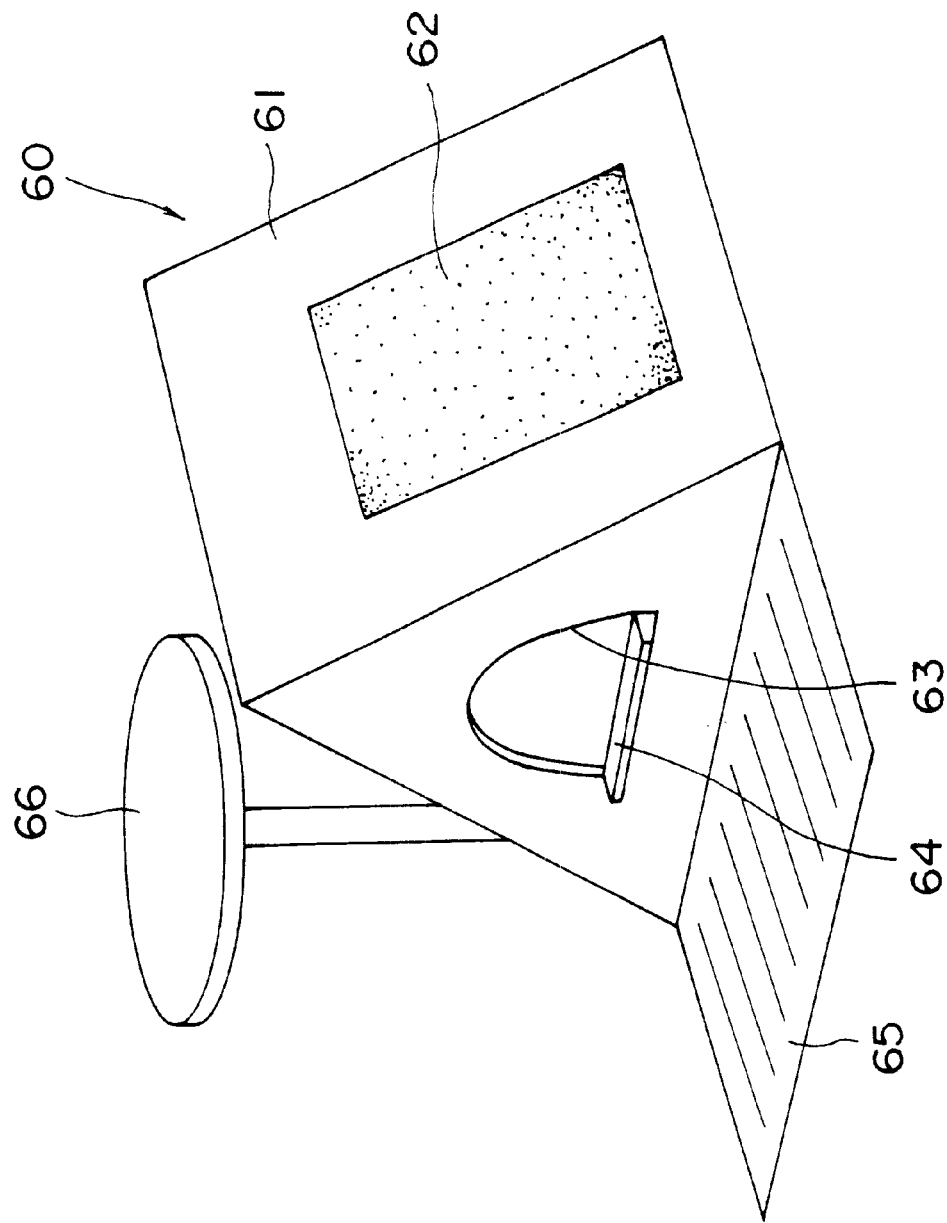
FIG. 12 is a schematic drawing showing the potty for a pet animal according the eighth embodiment described below.

FIG. 12 is a view showing the potty for a pet animal contained in an athletic house according to this eighth embodiment for the present invention.

In this embodiment, a nail-rubbing member 62 is provided on the roof 61 of the athletic house 60, openings 63 are oppositely formed in the opposing side of the athletic house, and a step 64 is formed at each bottom side of the openings 63 to facilitate the access of a cat.

Further, a mat 65 is provided in front of the opening, and a table 66 is provided at one side of the house for playing.

Although a cat is exampled in the embodiments described above, there is no limitation in the potty for a pet animal, and the potty of the present invention can be used for any small size pet animal allowed to rear indoor.

As explained above, according to the present invention, the following advantageous effects may be given.

(1) To provide a compact type potty for a pet animal, which is acceptable for a small house having less space, and to make required amount of sand to be used for excretion less.
(2) To facilitate cleaning and trashing of the excretion.
(3) A cat does not excrete directly on sand, but it requires sand to cover or hide the excretion. However, when a cat recognizes the presence of sand in the case, it can smoothly take excretion behavior with ease.
(4) Since the liquid portion of the excretion moves to the water-absorbing sheet through the sand, the frequency to change the sand can be reduced. Accordingly, the amount of sand to be consumed can be reduced, thereby allowing the reduction of the amount of sand to be brought into a room and less requirement of the space for storing the sand.
(5) Different from conventional potties for a pet animal wherein sand is provided in a sand tray, a problem of scattering sand around a potty may be resolved owing to equipping of a cover and a guard member.
(6) The case is produced in an accreted and watertight state, no smell may be leaked from the case.
(7) By providing the potty in a piece of furniture or an athletic house for a pet animal in one unit therewith, improvement in interior decoration may be obtainable.

What is claimed is:

1. A potty for a pet animal characterized in that the potty is constituted by:
   an outercase upwardly opened,
   an internal case to be fitted inside the outer case and containing a reticular member in the central part of the bottom,
   a cover to be fitted inside the peripheral margin of an upward opening of the internal case and having a hole at the central part of itself for excretion and fine pores are formed in the cover for excluding sand.

2. The potty for a pet animal according to claim 1, wherein sand is provided onto the reticular member in the internal case.

3. The potty for a pet animal according to claim 1, wherein the reticular member in the internal case is either a reticular component or a latticed component for covering a hole formed at the central part of the bottom of the internal case.

4. The potty for a pet animal according to claim 1, wherein the reticular member in the internal case is either a reticular component or a latticed component formed in accreted state to the case.

5. The potty for a pet animal according to claim 1, wherein the outer case and the internal case are detachably united at each of the flange part in watertight state.

6. The potty for a pet animal according to claim 1, wherein a guard member to cover the periphery of the cover and having openings for access for a pet animal in the longitudinal direction at the front and the rear parts of the case is provided.

7. The potty for a pet animal according to claim 6, wherein the outer case and the internal case are detachably united in watertight state at each of the flange parts, and the internal case, the cover and the guard member are detachably fitted with each other at each of the peripheral margins.

8. The potty for a pet animal according to claim 6, wherein the cover and the guard member are produced in accreted state by molding.

9. A potty for a pet animal characterized in that the potty is constituted by:
   an outer case upwardly opened,
   an internal case to be fitted inside the outer case and containing a reticular member in the central part of the bottom,
   a cover to be fitted inside the peripheral margin of an upward opening of the internal case and having a hole at the central part of itself for excretion
   and a hole for excretion is formed in the central part of the cover and a mat containing inside fine pores for excluding sand is installed.

10. The potty for a pet animal according to claim 1, wherein a water-absorbing means is provided on the bottom of the outer case.

11. The potty for a pet animal according to claim 1, wherein the bottom of the cover gradually inclines downward in a direction to the central hole of the cover.

12. The potty for a pet animal according to claim 1, wherein a storable drawer type case is provided onto the bottom face of the outer case and a water-absorbing means is installed inside the drawer type case.

13. The potty for a pet animal according to claim 1, wherein the pet animal is a cat.

* * * * *